US012617521B2

(12) United States Patent
Schmoll et al.

(10) Patent No.: US 12,617,521 B2
(45) Date of Patent: May 5, 2026

(54) COILING FOREIGN OBJECT DEBRIS COVER

(71) Applicant: TEXTRON AVIATION INC., Wichita, KS (US)

(72) Inventors: Steven Daniel Schmoll, Wichita, KS (US); Thomas Neal Gamber, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 133 days.

(21) Appl. No.: 18/784,467

(22) Filed: Jul. 25, 2024

(65) Prior Publication Data

US 2026/0062118 A1    Mar. 5, 2026

(51) Int. Cl.
| | |
|---|---|
| *B64C 13/04* | (2006.01) |
| *F16H 59/02* | (2006.01) |
| *G05G 1/04* | (2006.01) |
| *G05G 25/04* | (2006.01) |

(52) U.S. Cl.
CPC ......... *B64C 13/04* (2013.01); *F16H 59/0213* (2013.01); *G05G 25/04* (2013.01); *G05G 1/04* (2013.01)

(58) Field of Classification Search
CPC ....... B64C 13/04; F16H 59/0213; G05G 1/04; G05G 25/04
See application file for complete search history.

(56) References Cited

U.S. PATENT DOCUMENTS

| | | | | |
|---|---|---|---|---|
| 1,037,631 A | * | 9/1912 | Jones | F16H 59/0213 49/355 |
| 1,193,487 A | * | 8/1916 | Preston | G05G 25/04 180/90.6 |
| 4,566,399 A | * | 1/1986 | Hildebrand | G05G 1/025 116/28 R |
| 4,793,620 A | * | 12/1988 | Karch | G05G 25/04 74/18.1 |

(Continued)

FOREIGN PATENT DOCUMENTS

| | | | | | |
|---|---|---|---|---|---|
| DE | 19633483 A1 | * | 3/1998 | ......... | F16H 59/0213 |
| EP | 0718528 A1 | * | 6/1996 | ......... | F16H 59/0213 |
| JP | 2002036901 A | * | 2/2002 | | |

OTHER PUBLICATIONS

CJ4 Throttle Quadrant.jpg.
CJ3 Throttle Quadrant.png.

*Primary Examiner* — Adam D Rogers
(74) *Attorney, Agent, or Firm* — Hovey Williams LLP

(57) ABSTRACT

A FOD cover system including an elongated slider made of a non-stretchable, flexible material, a first roller, a second roller, and a roller support. The slider has a first end and a second end opposite the first end, and the slider is slidable between two spaced-apart portions of a control housing and mechanically actuatable fore and aft by a lever extending through an opening of the slider. The lever operates control components within the control housing. The first roller is fixed to the first end of the elongated slider and the second roller is fixed to the second end of the elongated slider. The first roller and the second roller are rotatably attached to a roller support. The first roller and the second roller may also each be spring biased in opposing rotational directions, maintaining the elongated slider taut during actuation thereof.

18 Claims, 9 Drawing Sheets

(56) References Cited

U.S. PATENT DOCUMENTS

| | | | | | |
|---|---|---|---|---|---|
| 4,953,493 | A | * | 9/1990 | Richmond | F16H 63/42 |
| | | | | | 116/DIG. 20 |
| 4,964,359 | A | * | 10/1990 | Richmond | F16H 63/42 |
| | | | | | 116/DIG. 20 |
| 8,272,599 | B2 | * | 9/2012 | Haverdings | B64C 13/042 |
| | | | | | 244/6 |
| 2002/0157493 | A1 | * | 10/2002 | Fujiwara | B60K 20/04 |
| | | | | | 74/473.1 |

* cited by examiner

1000

SHIFTING LEVER IN A FIRST DIRECTION, THEREBY COILING SLIDER AROUND ROLLER  1002

SHIFTING LEVER IN A SECOND DIRECTION, THEREBY UNCOILING SLIDER AROUND ROLLER  1004

COILING FOREIGN OBJECT DEBRIS COVER

BACKGROUND OF THE INVENTION

Foreign object debris (FOD) covers are used for covering openings in aircraft control housings, such as slots in a control pedestal or cover through which throttle levers extend and translate fore and aft. The FOD covers prevent FOD from entering aircraft control electronics and other such sensitive components. FOD covers are traditionally static relative to the control pedestal or housing and thus require an opening or slot through the cover allowing for the throttle levers, for example, to move fore and aft relative to the static FOD covers. This can lead to the FOD cover wearing out due to the friction from the throttle over time, and/or can lead to some FOD still entering through the slot formed into the static FOD cover.

SUMMARY OF THE INVENTION

Embodiments of the current invention address one or more of the above-mentioned problems and provide a distinct advance in the art of aircraft control foreign object debris (FOD) covers. In some embodiments, a FOD cover system includes an elongated slider made of a non-stretchable, flexible material, a first roller, a second roller, and a plurality of roller supports. The elongated slider has a first end and a second end opposite the first end and is slidable between two spaced-apart portions of a control housing and mechanically actuatable fore and aft. The first roller is fixed to the first end of the elongated slider and the second roller is fixed to the second end of the elongated slider. The first roller and the second roller are rotatably attached to at least one of the plurality of roller supports. The first roller and the second roller may also each be spring biased in opposing rotational directions, maintaining the elongated slider in a taut configuration.

Another embodiment of the invention is an aircraft system having system control components, a control housing, at least one lever, and a FOD cover system. The control housing at least partially covers the system control components and has at least one elongated slot formed through at least one panel of the control housing. The lever extends from the system control components and outward through the elongated slot. The FOD cover system includes at least one elongated slider, at least one first roller, at least one second roller, and a plurality of roller supports. The elongated slider is made of a non-stretchable, flexible material, and has a first end and a second end opposite the first end. The elongated slider also has at least one lever opening through which the lever extends. The first roller is fixed to the first end of the elongated slider, and the second roller is fixed to the second end of the elongated slider. In some embodiments, the plurality of roller supports may be fixed relative to the control housing and located within the control housing. Furthermore, the first roller and the second roller are rotatably attached to the plurality of roller supports.

Another embodiment of the invention is a method of protecting an aircraft control system from FOD during operation thereof. The method may include shifting a lever such as a thrust lever in a first direction as well as shifting the lever in a second opposite direction. The lever may extend from a system control component through an elongated slot of a control housing. The lever may also extend through a lever opening of an elongated slider of a FOD cover system. The elongated slider may be located within the control housing and may extend a length of the elongated slot. In this configuration, the shifting of the lever in the first direction shifts the slider in the first direction, coiling a first portion of the slider around a first roller while uncoiling a second portion of the slider from a second roller at an opposite end of the slider from the first roller. Conversely, the shifting of the lever in the second direction shifts the slider in the second direction, uncoiling the first portion of the slider from the first roller while coiling the second portion of the slider around the second roller. The first and second rollers may be spring biased to maintain the slider in a taut configuration throughout this method.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
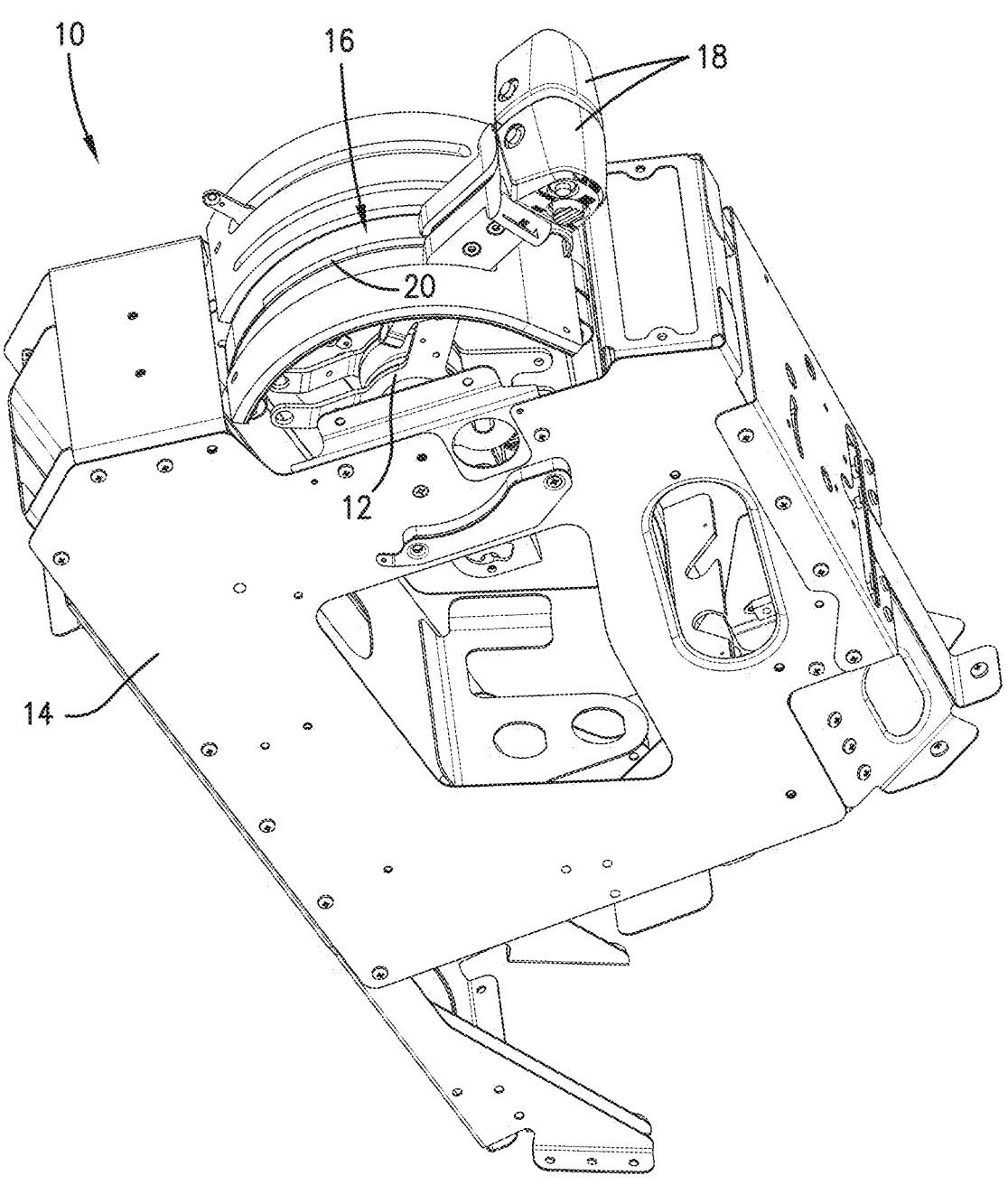
FIG. 1 is a side perspective view of an aircraft control system, constructed in accordance with embodiments of the present invention.
Figure 2:
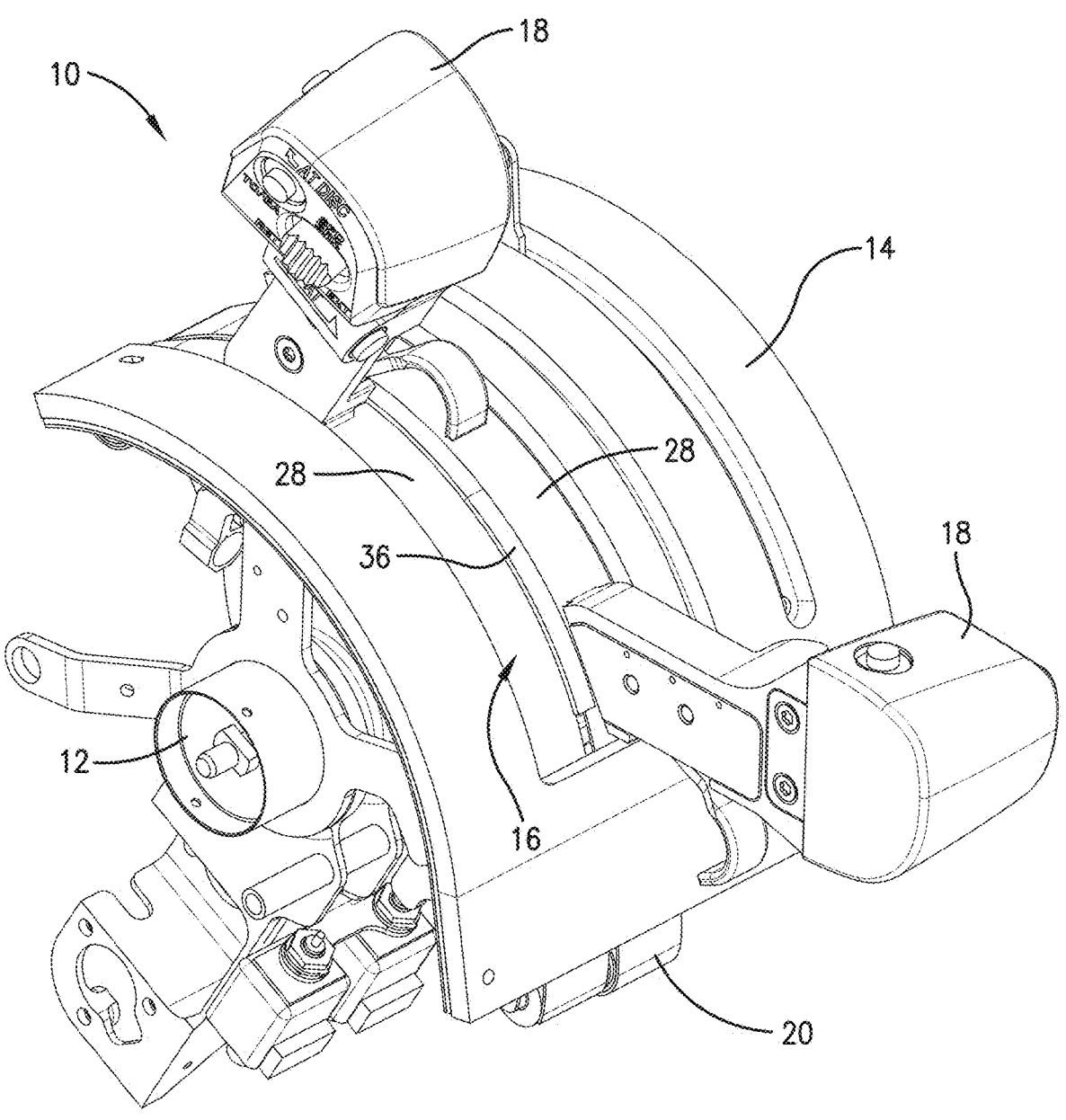
FIG. 2 is a top perspective view of the aircraft control system of FIG. 1, with side panels of a control housing removed and one lever actuated forward and another lever actuated aftward.
Figure 3:
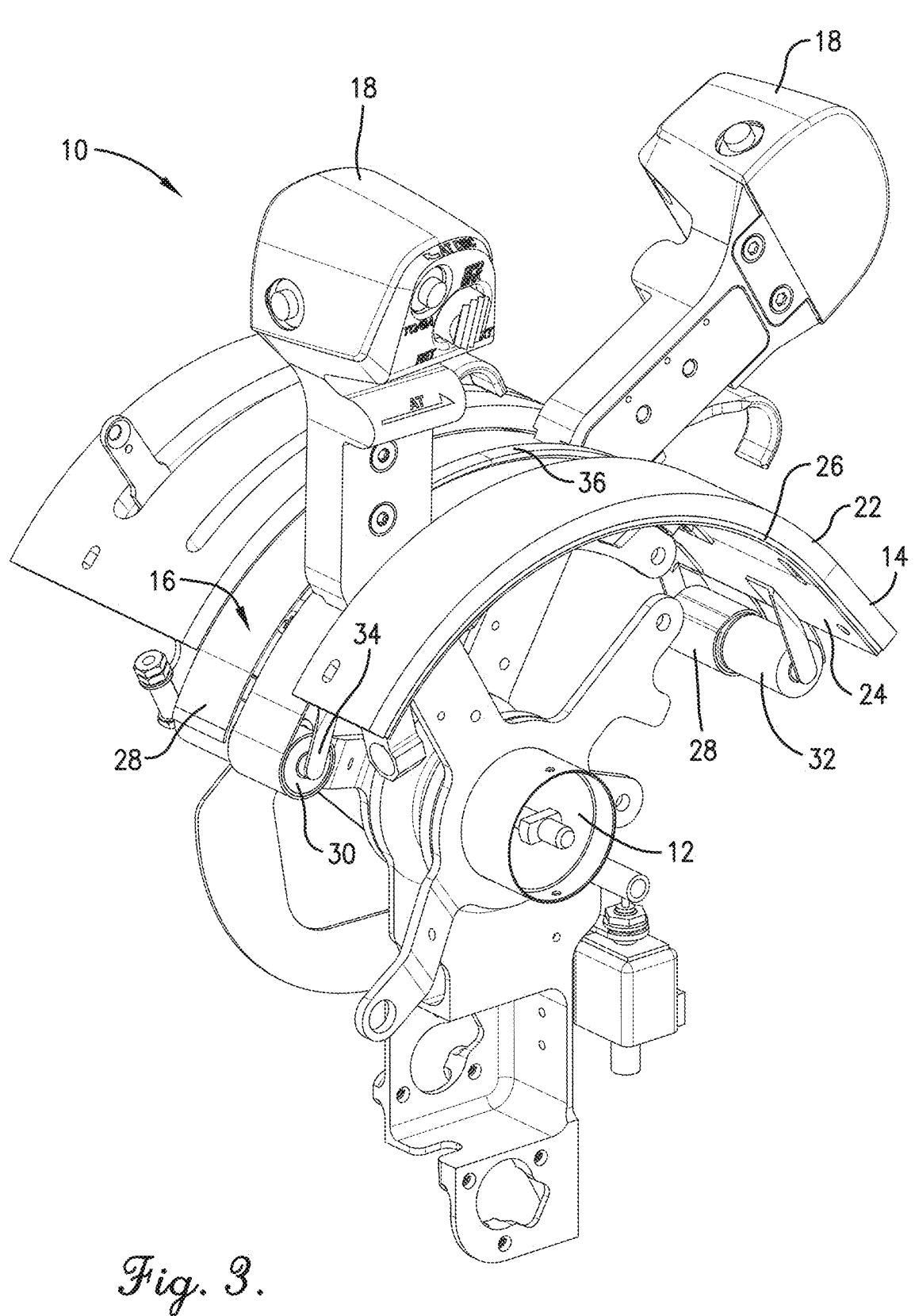
FIG. 3 is a top and side perspective view of the aircraft control system of FIG. 2 and a foreign object debris (FOD) cover system blocking debris from controls within the aircraft control system.
Figure 4:
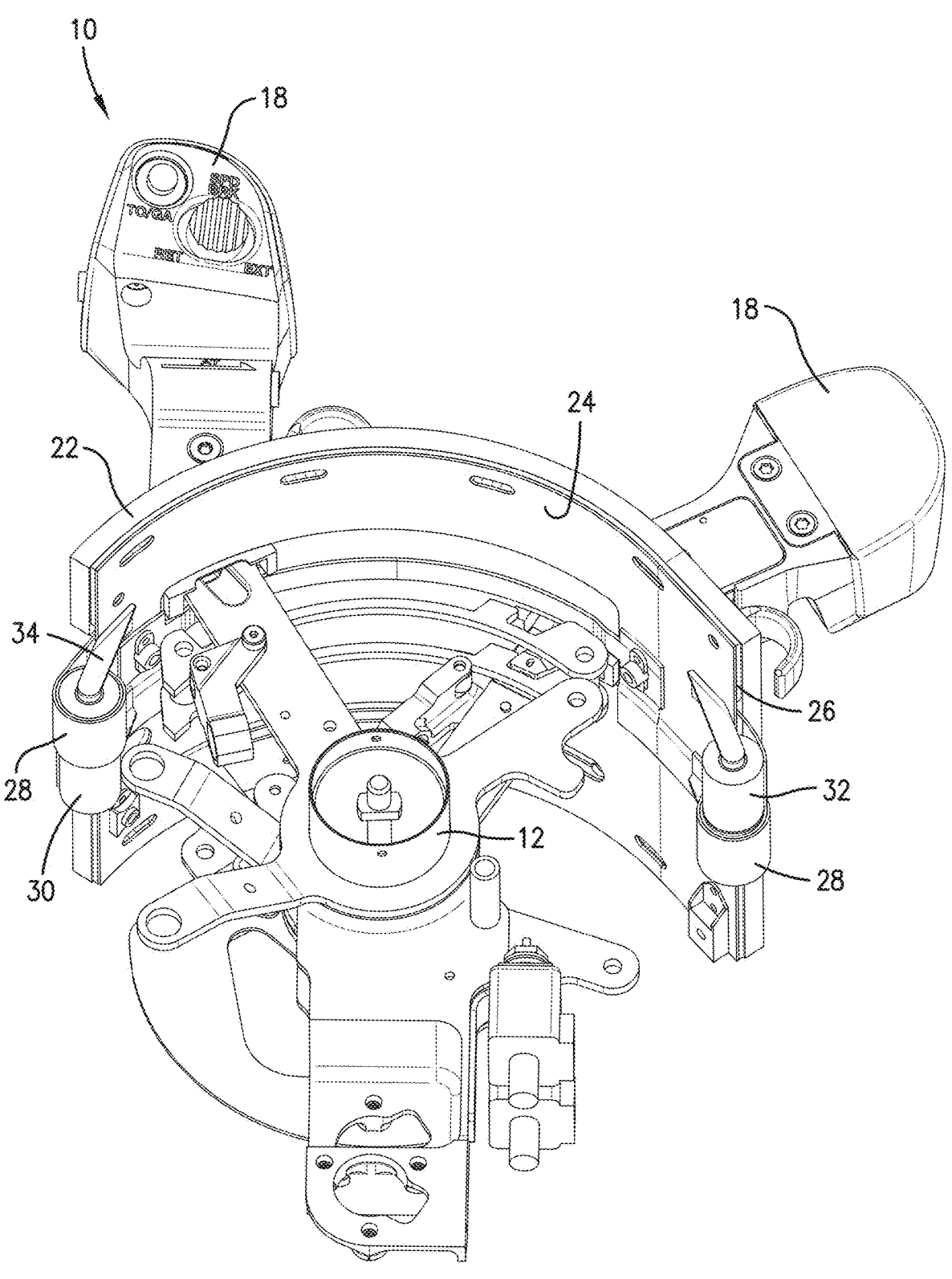
FIG. 4 is a bottom and side perspective view of the aircraft control system and FOD cover system of FIG. 3.

The drawing figures do not limit the current invention to the specific embodiments disclosed and described herein.

The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Foreign object debris (FOD) covers are used for covering openings in aircraft control housing, such as slots in a control pedestal or cover through which throttle levers extend and translate fore and aft. The FOD covers prevent FOD from entering into aircraft control electronics and other such sensitive components.

FOD covers are traditionally static relative to the control pedestal or housing and thus require an opening or slot through the cover allowing for the throttle levers, for example, to move fore and aft relative to the static FOD covers. This can lead to the FOD cover wearing out due to the friction from the throttle over time, and/or can lead to some FOD still entering through the slot formed into the static FOD cover.

Even if a FOD cover is formed in more of a sealed manner around the throttle at the point where it extends through the FOD cover and is thus designed to move along with the throttle, the FOD cover must still be long enough at opposing ends so that movement fore and aft does not result in openings at a fore or aft end of the slot formed through the cover (thus allowing debris to enter therethrough). This extra length at the opposing ends of the FOD cover can be problematic because the aircraft's control quadrant typically has severe space constraints given the various levers and structures required to house the aircraft's engine controls.

Therefore, in order to allow for a method of FOD prevention within a confined space around which there are moving components, the present invention includes a system 10, such as a cockpit pedestal system, having a plurality of aircraft controls 12, a control housing 14 with one or more elongated slots 16 formed therethrough, one or more levers 18 extending through the one or more elongated slots 16 of the control housing 14, and a coiling FOD cover system 20. The system 10 (e.g., the cockpit pedestal system depicted herein) may include, for example, a throttle quadrant module located between pilot seats in the cockpit.

The aircraft controls 12 can include a variety of electrical and mechanical components such as circuits, processors (e.g., fly-by-wire control components), motors, wires, levers, gears, hydraulic and/or mechanical linkages, cables, pulleys, and/or the like. For example, FIGS. 2-6 depict a variety of mechanical linkages which are fixedly and/or rotatably attached to various ones of the mechanical linkages to control aircraft thrust. Which ones of the variety of aircraft controls known in the art are included in the system 10 described herein may depend upon whether the aircraft uses a fly-by-wire (FBW) system or a mechanical control system for aircraft control. Any aircraft controls known in the art may be used herein without departing from the scope of the invention.

Figure 5:
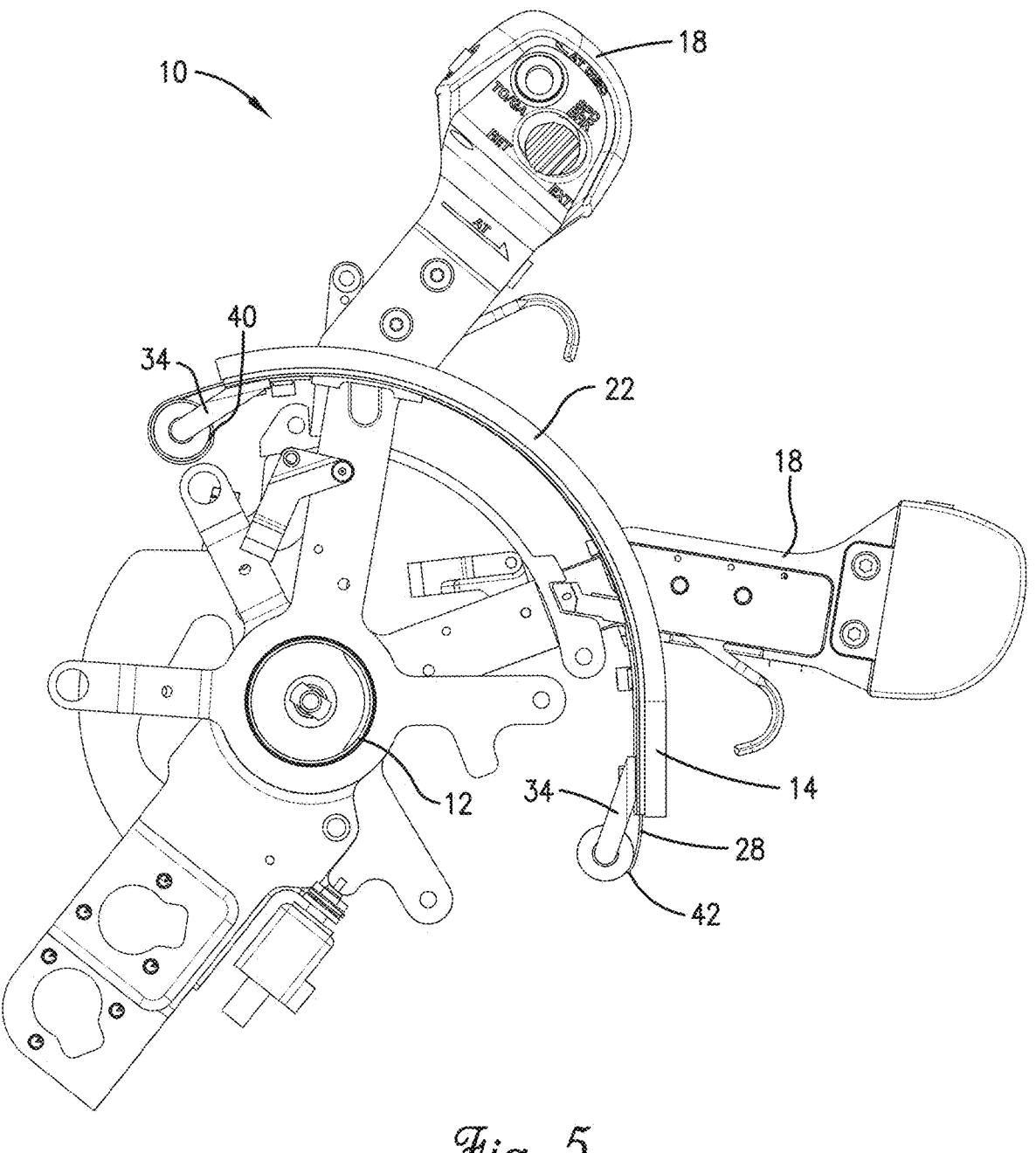
FIG. 5 is a side elevation view of the aircraft control system and FOD cover system of FIG. 3.
Figure 6:
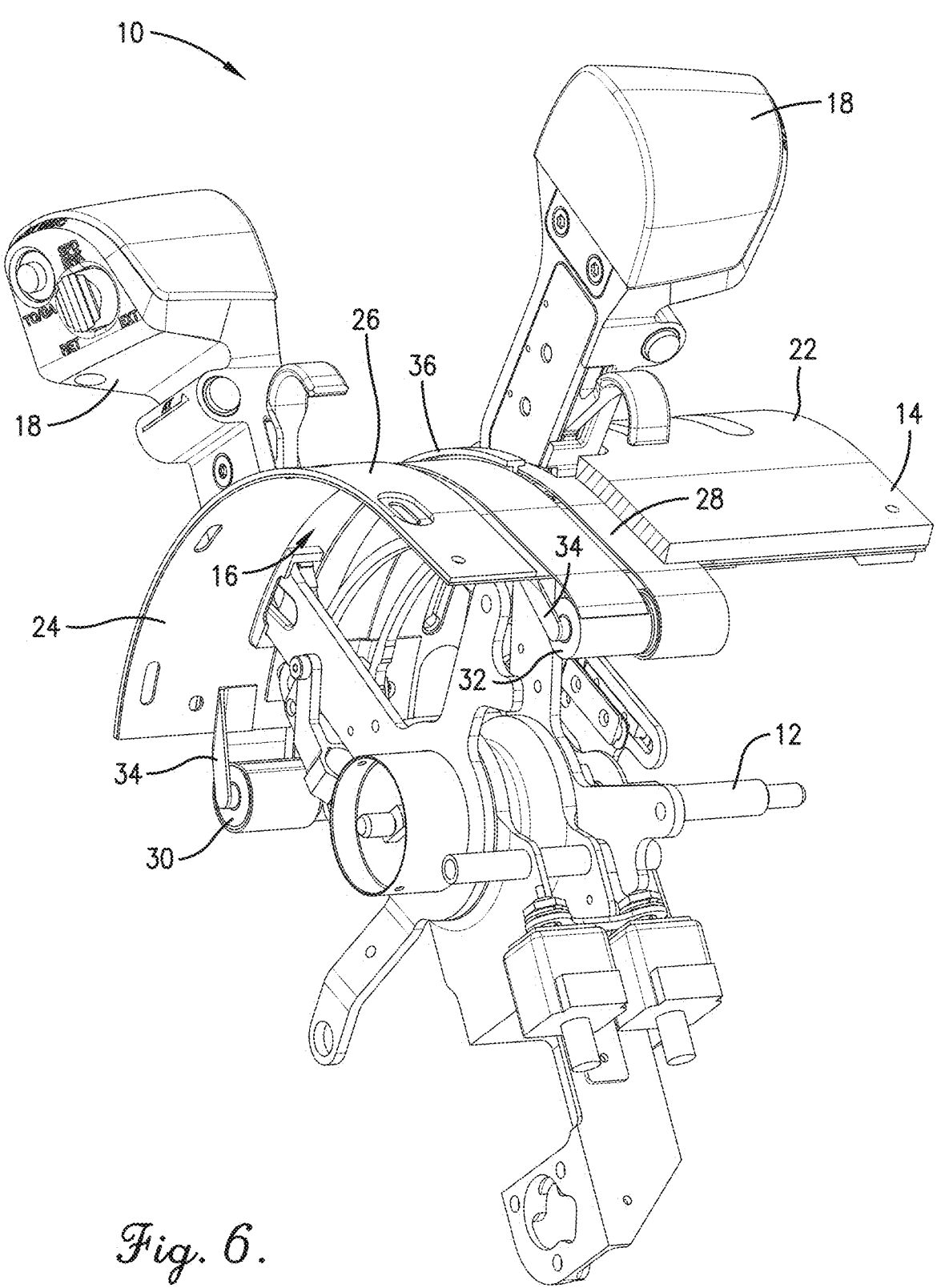
FIG. 6 is a side and end perspective view if the aircraft control system of FIG. 3, with a quadrant cover panel removed to reveal a spacer and more of the FOD cover system of FIG. 3.

The control housing 14, as depicted in FIGS. 1-6, may be made up of one or more rigid panels at least partially surrounding the aircraft controls 12. In some embodiments, the control housing specifically includes a plurality of panels and/or frames held in spaced relation apart from each other such that portions of the FOD cover system may be actuated within a space therebetween. The elongated slots 16 may be formed into at least one of the panels. For example, the panels may include a quadrant cover panel 22 through which the one or more of the elongated slots 16 are formed and a lower cover panel support structure 24 at least partially covered by the quadrant cover panel 22. The quadrant cover panel 22 and the lower cover panel support structure 24 may be spaced apart by one or more housing spacers 26, as depicted in FIG. 6 for example. In some embodiments, both the quadrant cover panel 22 and the lower cover panel support structure 24 may have a convex curvature to follow a rotational path of one of the levers 18 described herein. However, in other embodiments of the system 10, one or more of the panels described herein may be substantially planar, angled, or otherwise configured without departing from the scope of the invention described herein.

As depicted in FIGS. 1-6, the one or more levers 18 may be, for example, throttle control levers that are mechanically linked to components of the aircraft controls 12 to modulate engine thrust. The control levers 18 may be configured to actuate through mechanical force by a pilot or an autopilot system to translate fore and aft along one of the slots 16 of the control housing 14 by pivoting within the control housing 14 about a mechanical linkage component, allowing for control of certain operating features of the aircraft such as the thrust or acceleration thereof. In other embodiments, the levers 18 may additionally or alternatively include a flap indicator or a flap lever, as well as any other rotatable or translatable mechanical controls known in the art.

Figure 7:
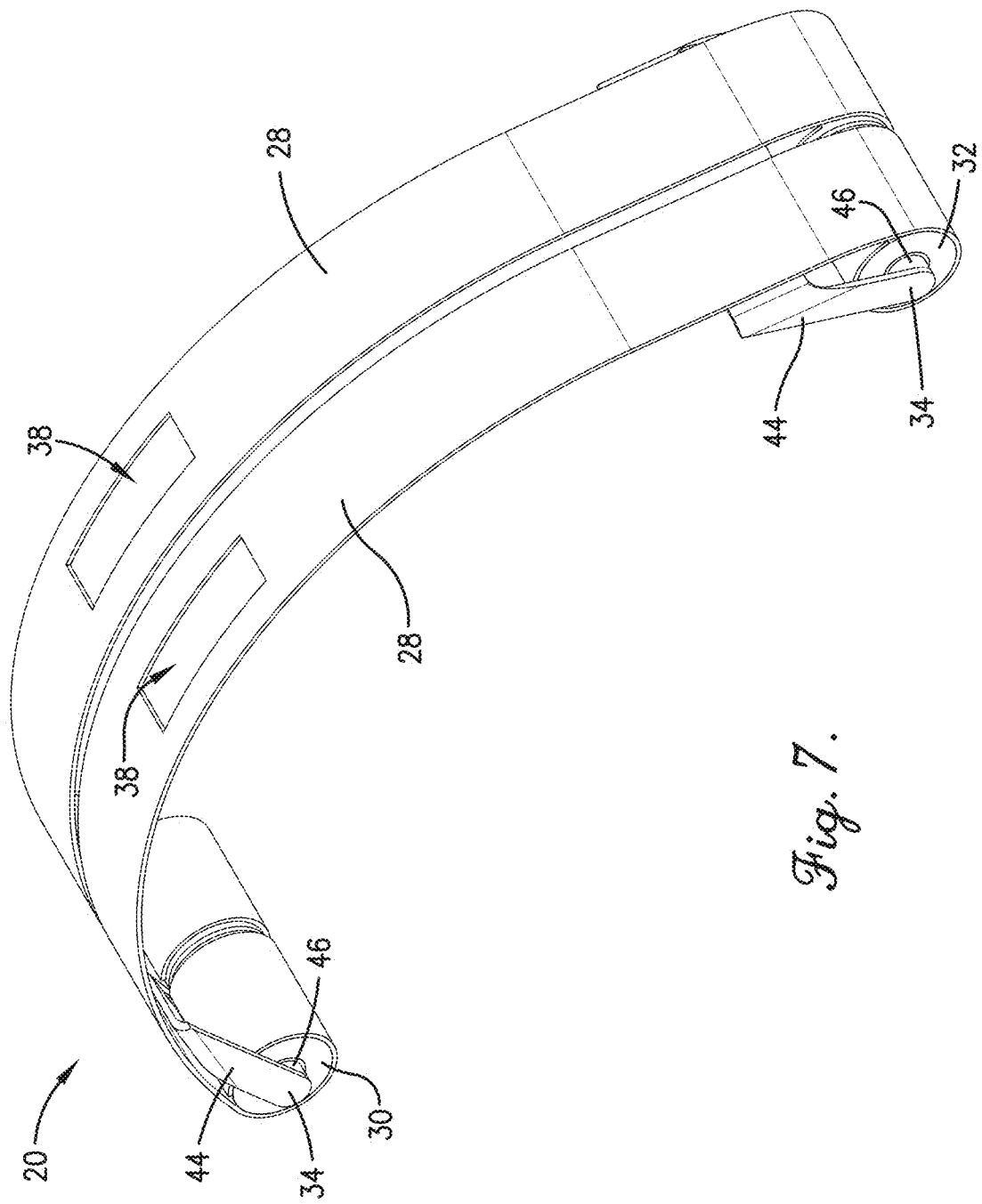
FIG. 7 is a top and side perspective view of the FOD cover system of FIG. 3, constructed in accordance with embodiments of the invention.
Figure 8:
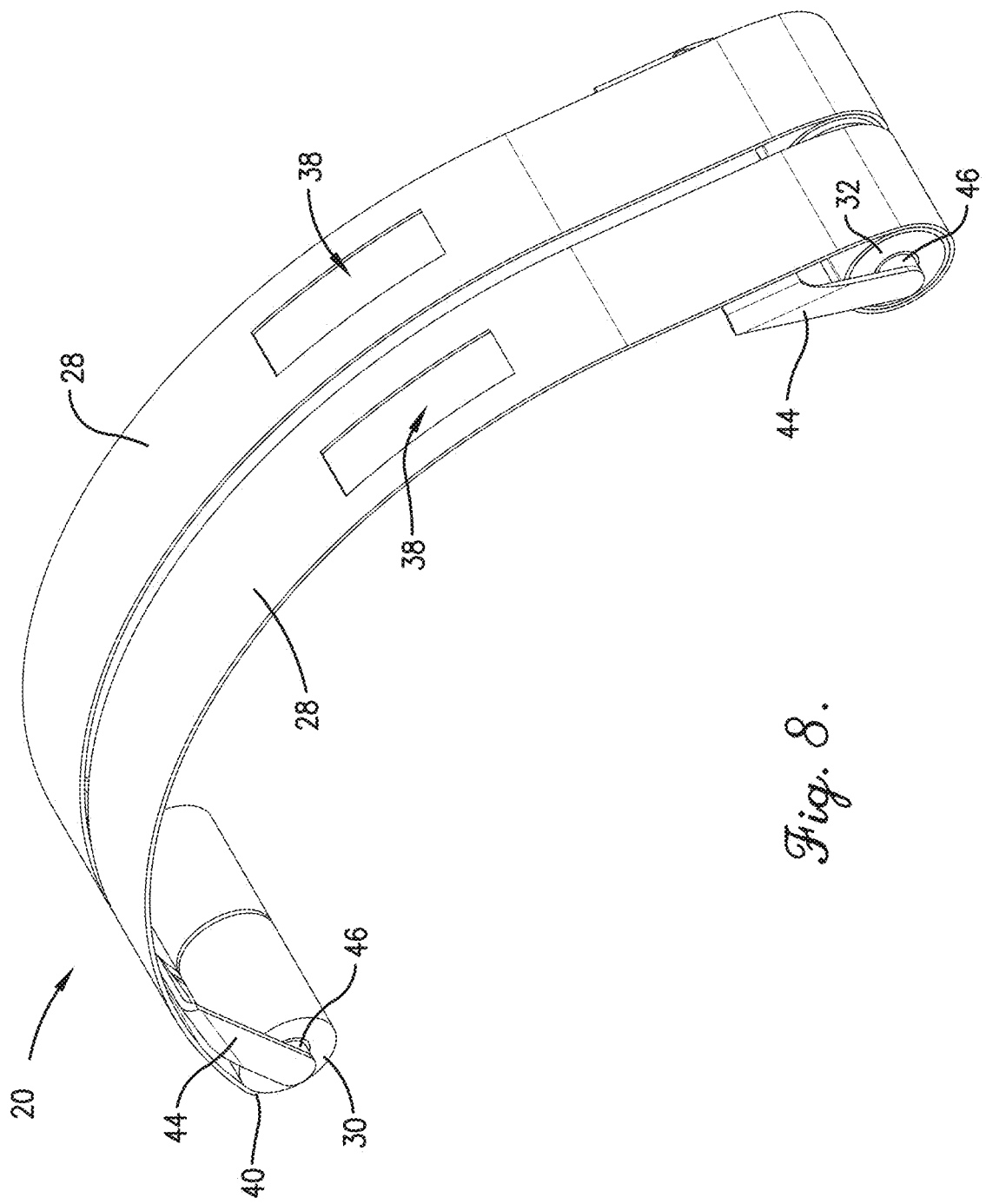
FIG. 8 is a top and side perspective view of the FOD cover system of FIG. 7 with sliders thereof mechanically shifted such that one end of FOD cover system sliders coils further around one set of rollers, while another end of the sliders uncoils from opposing rollers.
Figures 9, 10:
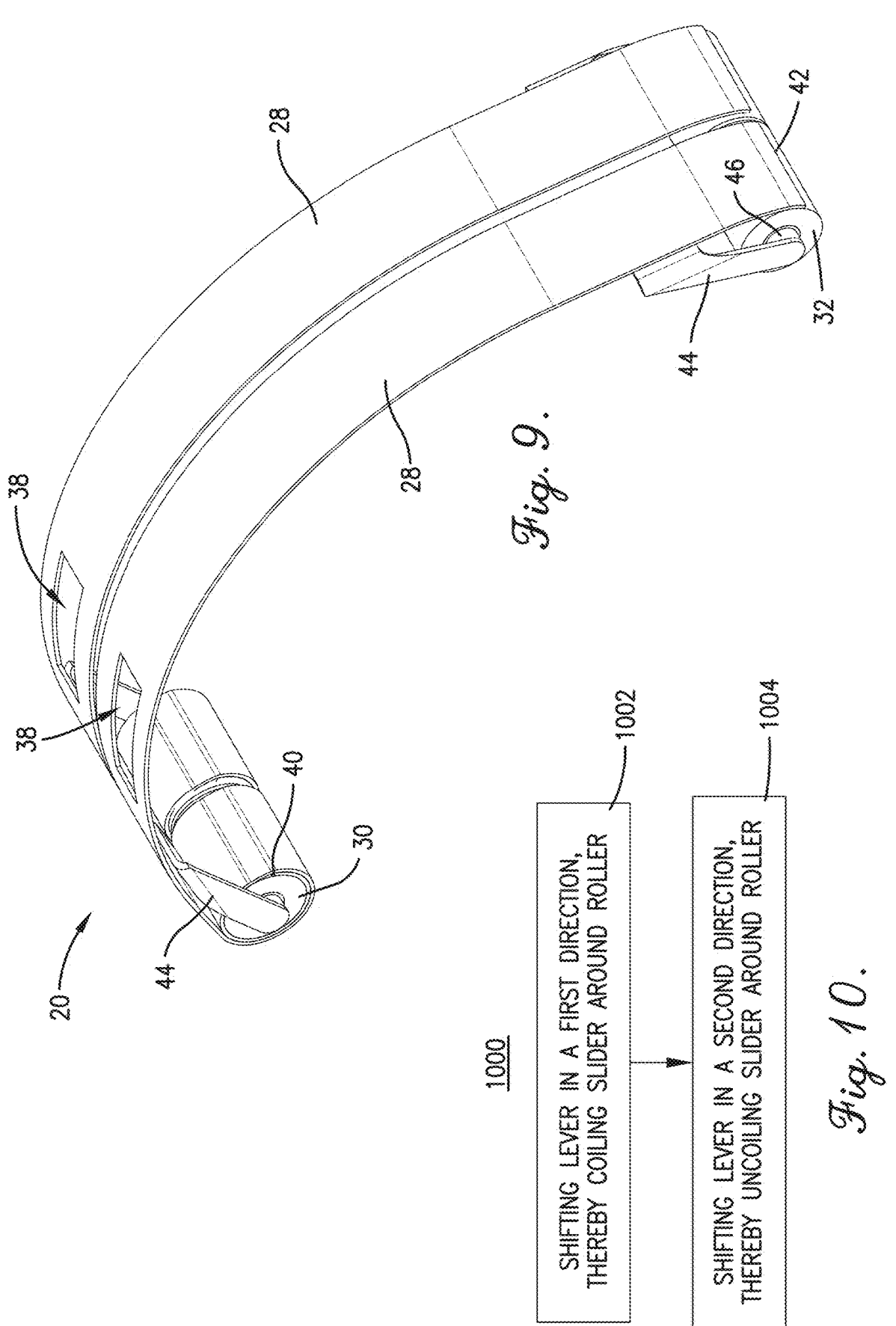
FIG. 9 is a top and side perspective view of the FOD cover system of FIG. 8 with the sliders mechanically shifted even further toward the one set of rollers and away from the opposing rollers.
FIG. 10 is a method flow chart of a method of protecting an aircraft control system from FOD while moving control levers thereof, in accordance with one embodiment of the invention.

The FOD cover system 20 is depicted as part of the system 10 in FIGS. 1-6 and on its own in FIGS. 7-9. The FOD cover system 20 includes one or more sliders 28, at least one first roller 30, at least one second roller 32, and roller supports 34 fixable to the control housing 14. Some embodiments may also include one or more slider spacers 36 between at least two of the sliders 28. For example, the slider spacers 36 may be fixed to and/or fixed relative to the control housing 14 (e.g., fixed to an outer surface of lower cover panel support structure 24). In some embodiments, the FOD cover system 20 includes only a single slider with a single lever extending therethrough without departing from the scope of the invention. In some embodiments, the sliders 28 are made of nylon, plastic, silicone, rubber, or any flexible but non-stretchable material. The sliders 28 may be positioned between the quadrant cover panel 22 and the lower cover panel support structure 24, for example, and slidable fore and aft therebetween. In various embodiments, one or more of the levers 18 extend through one or more of the sliders 28. For example, the sliders 28 can each have a lever opening 38 through which one of the levers 18 extend, such that when one or more of the levers 18 is pushed fore or pulled aft, the associated one of the sliders 28 slides fore or aft therewith. The lever opening 38 is small enough to prevent much if any FOD therethrough when the lever extends therethrough. In some embodiments, the lever opening 38 may be sized and shaped to match a size and shape of a cross-section of the corresponding lever 18, such that the lever 18 extends through the lever opening 38 with no gap or minimal gapping between boundaries of the lever opening 38 and the lever 18.

As depicted in FIGS. 5, 8, and 9, each of the sliders 28 has a first end 40 and an opposite second end 42, with the first and second ends 40,42 fixed to opposing ones of the first and second rollers 30,32, respectively. In some embodiments, the first one of the sliders 28 is attached at its opposing ends 40,42 to a pair of opposing first and second rollers 30,32 and a second one of the sliders 28 is attached at its opposing ends 40,42 to a second pair of the opposing first and second rollers 30,32. Each of the elongated sliders 28 has a width and a length that extends between corresponding ones of the first roller 30 and the second roller 32. In some embodiments, the width of the elongated slider 28 is greater than a width of the elongated slot 16 and the length of the elongated slider 28 is greater than a length of the elongated slot 16, the elongated slider 28 thus protecting at least one system control component of the aircraft controls 12 from FOD entering the elongated slot 16.

In some embodiments, the first and second rollers 30,32 are rotatably supported by the roller supports 34. The roller supports 34 may be fixed to or fixed relative to the control housing 14 and may in some embodiments be located within the control housing 14. Although the roller supports 34 are depicted as fixed to the control housing 14, note that the roller supports 34 may be fixed to other structures of an aircraft without departing from the scope of the invention herein. In one or more embodiments, the roller supports 34 may include support arms 44 and support cylinders 46 that are fastened or fastenable to the support arms 44. The support arms 44 may extend to the control housing 14, such as the quadrant cover panel 22 and/or the lower cover panel support structure 24 and may be fixed or fixable thereto, such as with a bolt or some other mechanical fastener. For example, the support arms 44 may each have a ledge extending therefrom, shaped and angled to rest substantially flush against the lower cover panel support structure 24 and mechanically attached thereto. Alternatively, the support arms 44 may be integrally formed with the control housing 14 or a portion thereof, such as the lower cover panel support structure 24.

In some embodiments, the first and second rollers 30,32 are each freely rotatable about one of the support cylinders 46. The first and second rollers 30,32 and/or other such rollers may all independently rotate about a single support cylinder or alternatively there may be a plurality of support cylinders about which different ones of the rollers 30,32 rotate. Furthermore, in some embodiments, the first and second rollers 30,32 are spring-biased in opposing directions away from each other, such that the sliders 28 each wrap around the first roller 30 and/or the second roller 32 and the sliders 28 remain taut regardless of the direction in which the one or more levers 18 pull the slider.

In use, as one of the levers 18 is pivoted and/or translated within one of the slots 16 of the control housing 14 in a generally forward direction (relative to the cockpit of the aircraft, for example), the slider 28 through which that one of the levers 18 extends is also thereby slid in a generally forward direction via the motion of the lever 18 acting on the slider 28. An associated one of the first rollers 30 thus takes up the excess portion of that slider 28, coiling the slider 28 around that first roller 30, while an associated one of the second rollers 32 unravels a portion of that slider 28 previously coiled thereon prior to the movement of the lever 18 being actuated forward. Likewise, as that same lever 28 is pivoted and/or translated within its slot 16 of the control housing 14 back in a generally aftward direction (relative to the cockpit of the aircraft, for example), the associated slider 28 is likewise slid in a generally aftward direction via the motion of the lever 18 acting on the slider 28 through which it extends. The associated first roller 30 thus releases at least a portion of that slider 28 that was coiled thereon, while the associated second roller 32 takes up at least some of the excess portion of that slider 28.

The flow chart of FIG. 10 depicts in more detail the steps of an exemplary method 1000 of protecting an aircraft control system from FOD, according to one or more embodiments of the present invention. In some embodiments of the invention, various steps may be omitted and/or steps may occur out of the order depicted in FIG. 10 without departing from the scope of the invention. For example, two blocks shown in succession in FIG. 10 may in fact be executed in the reverse order depending upon the functionality involved.

A method 1000 of protecting an aircraft control system from FOD, as depicted in FIG. 10, may include a step of shifting a lever extending from at least one system control component through the elongated slot of the control housing in a first direction, as depicted in block 1002. For example, the lever may extend through the lever opening of the elongated slider of the FOD cover system, as described above. The elongated slider may be located within the control housing and may extend a length of the elongated slot, as depicted in FIGS. 1-6. Based on the configurations described herein, the shifting of the lever in the first direction shifts the slider in the first direction as well, coiling a first portion of the slider around the first roller while uncoiling a second portion of the slider from the second roller at an opposite end of the slider from the first roller.

Likewise, the method 1000 may further include a step of shifting the lever in a second direction that is opposite the first direction, as depicted in block 1004. Specifically, the shifting of the lever in the second direction shifts the slider in the second direction, uncoiling the first portion of the slider from the first roller while coiling the second portion of the slider around the second roller. As described above, the first roller and the second roller may each be spring biased in opposing rotational directions, maintaining the slider in a taut configuration during the shifting of the lever in the first direction and the shifting of the lever in the second direction. Note that the first and second directions described herein can refer to movement fore and aft within an aircraft or can alternatively refer to movement generally left to right, up and down, or in any opposing directions, depending upon the orientation in which the systems described herein are installed into a control cover of any kind. Likewise, although the system 10 and the FOD cover system 20 are depicted and described herein for use in aircrafts, note that these embodiments may alternatively be used for other types of vehicles, other types of control mechanisms, or any systems having lever controls or other actuatable components that could benefit from a FOD cover within a slot of an actuating mechanical component.

Advantageously, this method 1000 allows the slider 28 of the FOD cover system 20 to continuously cover the elongated slot 16 in the control housing 14 as the lever 18 is being actuated, while also minimizing the space taken up by the slider 28 within the control housing 14 at opposing ends of the elongated slot 16, since the slider 28 is taken up and let out by spring biased rollers as the slider 28 is actuated back and forth by the lever 18.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for"or "step for"language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A foreign object debris (FOD) cover system comprising:
an elongated slider made of a non-stretchable, flexible material, the elongated slider having a first end and a second end opposite the first end, wherein the elongated slider is slidable between two spaced-apart portions of a control housing and is mechanically actuatable fore and aft;
a first roller fixed to the first end of the elongated slider;

a second roller fixed to the second end of the elongated slider; and
at least one roller support on which the first roller and the second roller are rotatably attached, wherein the first roller and the second roller are each spring biased in opposing rotational directions, maintaining the elongated slider in a taut configuration.

2. The FOD cover system of claim 1, wherein the elongated slider comprises two elongated sliders and wherein the FOD cover system further includes a spacer fixed between the two elongated sliders, such that the two elongated sliders are slidable relative to the spacer.

3. The FOD cover system of claim 1, further comprising:
the control housing having an elongated slot formed through at least one panel of the control housing, wherein the elongated slider is housed within the control housing; and
a lever extending from within the control housing and outward through the elongated slider and the elongated slot, such that movement of the lever mechanically actuates the elongated slider fore and aft.

4. The FOD cover system of claim 3, wherein the elongated slider has a lever opening formed therethrough, sized and shaped to match a size and shape of a cross-section of the lever, wherein the lever extends through the lever opening.

5. The FOD cover system of claim 3, wherein the at least one roller support is fixed relative to the control housing.

6. The FOD cover system of claim 5, wherein the at least one roller support includes support arms fixed to an inner surface of the control housing and support cylinders fixed to the support arms, wherein the first roller and the second roller are each rotatably mounted onto one of the support cylinders.

7. The FOD cover system of claim 6, wherein the support arms are each shaped and angled to rest substantially flush against the inner surface of the control housing and are mechanically attached to the control housing.

8. The FOD cover system of claim 3, wherein the control housing includes a lower cover panel support structure and a quadrant cover panel spaced apart from and at least partially covering the lower cover panel support, wherein the slider is positioned between the lower cover panel support structure and the quadrant cover panel.

9. An aircraft system comprising:
system control components;
a control housing at least partially covering the system control components and having at least one elongated slot formed through at least one panel of the control housing;
at least one lever extending from the system control components and outward through the at least one elongated slot;
a foreign object debris (FOD) cover system comprising:
at least one elongated slider made of a non-stretchable, flexible material, the at least one elongated slider having a first end and a second end opposite the first end, wherein the at least one elongated slider has at least one lever opening formed therethrough, wherein the at least one lever extends through the at least one lever opening,
at least one first roller fixed to the first end of the at least one elongated slider,
at least one second roller fixed to the second end of the at least one elongated slider, and
at least one roller support within the control housing, wherein the at least one first roller and the at least one second roller are rotatably attached to the at least one roller support, wherein the at least one elongated slider comprises two elongated sliders and the FOD cover system further includes a spacer fixed between the two elongated sliders.

10. The aircraft system of claim 9, wherein the at least one first roller and the at least one second roller are each spring biased in opposing rotational directions, maintaining the at least one elongated slider in a taut configuration.

11. The aircraft system of claim 9, wherein the at least one lever opening is sized and shaped to match a size and shape of a cross-section of the at least one lever.

12. The aircraft system of claim 9, wherein the at least one roller support includes support arms fixed to an inner surface of the control housing and support cylinders fixed to the support arms, wherein the at least one first roller and the at least one second roller are each rotatably mounted onto one of the support cylinders.

13. The aircraft system of claim 12, wherein the support arms are each shaped and angled to rest substantially flush against the inner surface of the control housing and are mechanically attached to the control housing.

14. The aircraft system of claim 9, wherein the at least one elongated slider has a width and a length that extends between the at least one first roller and the at least one second roller, wherein the width of the at least one elongated slider is greater than a width of the at least one elongated slot and the length of the at least one elongated slider is greater than a length of the at least one elongated slot.

15. A method of protecting an aircraft control system from foreign object debris (FOD), the method comprising:

shifting a lever extending from at least one system control component through an elongated slot of a control housing in a first direction, wherein the lever extends through a lever opening of an elongated slider of a FOD cover system, wherein the elongated slider is within the control housing and extends a length of the elongated slot, wherein the shifting of the lever in the first direction shifts the slider in the first direction, coiling a first portion of the slider around a first roller while uncoiling a second portion of the slider from a second roller at an opposite end of the slider from the first roller; and shifting the lever in a second direction that is opposite the first direction, wherein the shifting of the lever in the second direction shifts the slider in the second direction, uncoiling the first portion of the slider from the first roller while coiling the second portion of the slider around the second roller.

16. The method of claim 15, wherein the first roller and the second roller are each spring biased in opposing rotational directions, maintaining the elongated slider in a taut configuration during the shifting of the lever in the first direction and the shifting of the lever in the second direction.

17. The method of claim 15, wherein the slider is positioned between a lower cover panel support structure and a quadrant cover panel, through which the elongated slot is formed.

18. The method of claim 15, wherein the elongated slider has a width and a length that extends between the first roller and the second roller, wherein the width of the elongated slider is greater than a width of the elongated slot and the length of the elongated slider is greater than a length of the elongated slot, the elongated slider thus protecting the at least one system control component from FOD entering the elongated slot.

\* \* \* \* \*